United States Patent
Leighton et al.

(10) Patent No.: US 12,017,739 B2
(45) Date of Patent: Jun. 25, 2024

(54) APPARATUS AND METHOD FOR PREVENTION AND TREATMENT OF MARINE BIOFOULING

(71) Applicant: SLOAN WATER TECHNOLOGY LIMITED, London (GB)

(72) Inventors: Timothy Grant Leighton, Southampton (GB); Freya Jane Malcher, Southampton (GB); Craig Dolder, Southampton (GB); Alexander James Rayner Westley, Argyll & Bute (GB); Mengyang Zhu, Southampton (GB); Thomas Secker, Southampton (GB)

(73) Assignee: SLOAN WATER TECHNOLOGY LIMITED, London (GB)

( * ) Notice: Subject to any disclaimer, the term of this patent is extended or adjusted under 35 U.S.C. 154(b) by 756 days.

(21) Appl. No.: 16/770,296

(22) PCT Filed: Dec. 6, 2018

(86) PCT No.: PCT/EP2018/083892
§ 371 (c)(1),
(2) Date: Jun. 5, 2020

(87) PCT Pub. No.: WO2019/110771
PCT Pub. Date: Jun. 13, 2019

(65) Prior Publication Data
US 2021/0139115 A1    May 13, 2021

(30) Foreign Application Priority Data

Dec. 6, 2017    (GB) ...................................... 1720342

(51) Int. Cl.
| B63B 59/04 | (2006.01) |
| B01D 19/00 | (2006.01) |
(Continued)

(52) U.S. Cl.
CPC .......... *B63B 59/04* (2013.01); *B01D 19/0031* (2013.01); *B01D 19/0057* (2013.01);
(Continued)

(58) Field of Classification Search
CPC ............ B01D 19/0031; B01D 19/0057; B01D 36/001; B08B 17/02; B08B 2203/0288;
(Continued)

(56) References Cited

U.S. PATENT DOCUMENTS

| 2,751,783 A | 6/1956 | Erdman |
| 3,405,916 A | 10/1968 | Carmichael |

(Continued)

FOREIGN PATENT DOCUMENTS

| CN | 102574169 A | 7/2012 |
| CN | 204972417 U | 1/2016 |

(Continued)

OTHER PUBLICATIONS

English translation of FR 2593090 A1 downloaded from Search database / (Year: 1987).*

(Continued)

*Primary Examiner* — Terry K Cecil
(74) *Attorney, Agent, or Firm* — Banner & Witcoff, Ltd.

(57) ABSTRACT

An apparatus and method for prevention and treatment of marine biofouling on a surface to be treated by the apparatus includes a body defining a cavity, the body terminating in a distal open end that is adapted, in use, to be in the vicinity of a surface to be treated such that the surface forms a first end wall of a chamber within the cavity; an acoustic transducer mounted within the cavity to form an opposite second end wall of the chamber, the acoustic transducer being adapted to cause acoustic pressure fluctuations; and a reservoir for a liquid, the reservoir including an inlet passage and a plurality of mutually spaced outlet passages for liquid (Continued)

flow from the reservoir into the chamber, the outlet passages at least partially surrounding the chamber in the vicinity of the distal open end.

19 Claims, 3 Drawing Sheets

(51) Int. Cl.
*B01D 36/00* (2006.01)
*B08B 3/12* (2006.01)
*B08B 7/02* (2006.01)
*B08B 17/02* (2006.01)

(52) U.S. Cl.
CPC .............. *B01D 36/001* (2013.01); *B08B 3/12* (2013.01); *B08B 7/028* (2013.01); *B08B 17/02* (2013.01); *B08B 2203/0288* (2013.01)

(58) Field of Classification Search
CPC .......... B08B 3/12; B08B 7/028; B63B 59/04; E02B 17/0017
See application file for complete search history.

(56) References Cited

U.S. PATENT DOCUMENTS

| | | | |
|---|---|---|---|
| 4,103,519 A * | 8/1978 | Davidson | A47L 11/4083 134/1 |
| 4,444,146 A | 4/1984 | De Witz et al. | |
| 4,507,969 A | 4/1985 | Djordjevic et al. | |
| 5,001,932 A | 3/1991 | Light et al. | |
| 5,368,054 A | 11/1994 | Koretsky et al. | |
| 5,690,145 A | 11/1997 | Kuklinski et al. | |
| 6,003,527 A | 12/1999 | Netsu et al. | |
| 6,162,738 A | 12/2000 | Chen et al. | |
| 6,230,722 B1 | 5/2001 | Mitsumori et al. | |
| 7,117,741 B2 | 10/2006 | Klein et al. | |
| 7,165,563 B1 * | 1/2007 | Boyd | H01L 21/67057 134/99.1 |
| 10,661,314 B2 * | 5/2020 | Birkin | B08B 7/028 |
| 2003/0106566 A1 | 6/2003 | Danese et al. | |
| 2006/0060991 A1 | 3/2006 | Holsteyns et al. | |
| 2006/0191562 A1 | 8/2006 | Nunomura et al. | |
| 2007/0062555 A1 | 3/2007 | Chang et al. | |
| 2008/0017219 A1 | 1/2008 | Franklin | |
| 2008/0209650 A1 | 9/2008 | Brewer et al. | |
| 2010/0297346 A1 | 11/2010 | Sawada et al. | |
| 2015/0044632 A1 | 2/2015 | Bergheim et al. | |
| 2021/0139115 A1 | 5/2021 | Birkin et al. | |

FOREIGN PATENT DOCUMENTS

| | | | | |
|---|---|---|---|---|
| DE | 4111592 A1 | 10/1992 | | |
| EP | 0579275 A1 | 1/1994 | | |
| EP | 0839586 A2 | 5/1998 | | |
| EP | 3009202 A2 | 4/2016 | | |
| FR | 2593090 A1 * | 7/1987 | ............ | B29C 48/27 |
| GB | 2516652 A | 2/2015 | | |
| GB | 2569136 A | 6/2019 | | |
| JP | 644285 | 1/1989 | | |
| JP | H3264682 A | 11/1991 | | |
| JP | H0731939 A | 2/1995 | | |
| JP | H08290211 A | 11/1996 | | |
| JP | H0924351 A | 1/1997 | | |
| JP | H09287990 A | 11/1997 | | |
| JP | 2001245381 A | 9/2001 | | |
| JP | 2004082038 A | 3/2004 | | |
| JP | 2004167377 A | 6/2004 | | |
| JP | 2005058804 A | 3/2005 | | |
| JP | 2005093873 A | 4/2005 | | |
| JP | 2005296884 A | 10/2005 | | |
| JP | 2007311756 A | 11/2007 | | |
| JP | 2008119642 A | 5/2008 | | |
| JP | 2009525867 A | 7/2009 | | |
| SU | 929236 A1 | 5/1982 | | |
| WO | 2009037930 A1 | 3/2009 | | |
| WO | 2016180978 A1 | 11/2016 | | |
| WO | 2019110771 A1 | 6/2019 | | |

OTHER PUBLICATIONS

Jul. 29, 2021—(CA) Office Action—App 3,084,868.
Dec. 9, 2021—(GB) Office Action—App 1720342.3.
Feb. 17, 2022—(GB) Examination Report—App 1720342.3.
Apr. 8, 2022—(CA) 2nd Office Action—App 3,084,868.
May 16, 2022—(GB) Examination Report—App 1720342.3.
Mar. 11, 2019—(WO) International Search Report and Written Opinion—App PCT/EP2018/083892.
M. Salta et al, "Bubbles versus biofilms: a novel method for the removal of marine biofilms attached on antifouling coatings using an ultrasonically activated water stream", Surface Topography: Metrology and Properties, 4 (2016) 034009.
M. Salta et al, "Bubbles versus biofilms: a novel method for the removal of marine biofilms attached on antifouling coatings using an ultrasonically activated water stream", Surface Topography: Metrology and Properties, 4 (2016) 034009; 11 pages; iopscience.iop.org.
Aug. 20, 2015—(GB) Search Report—App GB1508167.2.
Nov. 14, 2017—(WO) IPRP—App PCT/2016/060911.
Oct. 17, 2016—(WO) ISR & WO—App PCT/EP2016/060911.
Nov. 24, 2020—(AU) Examination Report No. 1—App 2018285022.
Nov. 25, 2020 (NZ) Patent Examination Report 1—App 760615.
Jan. 22, 2020—(EP) Office Action—App 18738198.3.
Jan. 15, 2016 (EP) Search Report—App 15196928.4.
Dec. 24, 2009—(GB) Search Report—App GB0914836.2.
May 5, 2011—(WO) International Serch Report—App PCT/EP2010/062448.
Jan. 14, 2015—(CN) Office Action—App 201080045751.5 (Eng trans).
Aug. 15, 2014—(JP) Office Action—App 2012-526053 (Eng Trans).
Sep. 23, 2014—(RU) Office Action—App 2012111316—(partial Eng trans).
Jan. 26, 2016—(EP) Partial Serach Report—App 15196928.4.
Dec. 17, 2020—(CN) Office Action—App 201680041121.8 (Eng trans).
Jan. 13, 2023—(CA) 3rd Office Action—App 3,084,868.

* cited by examiner

APPARATUS AND METHOD FOR PREVENTION AND TREATMENT OF MARINE BIOFOULING

CROSS-REFERENCE TO RELATED APPLICATIONS

The present application is a U.S. National Phase of International Application No. PCT/EP2018/083892, filed on Dec. 6, 2018, designating the United States of America, which claims priority to British Patent Application No. 1720342.3, filed on Dec. 6, 2017, and this application claims priority to and the benefit of the above-identified applications, which are fully incorporated by reference herein in their entireties.

FIELD OF THE INVENTION

The present invention relates to an apparatus for prevention and treatment of marine biofouling and to a method of prevention or treatment of marine biofouling.

BACKGROUND OF THE INVENTION

The Applicant's earlier WO-A-2016/180978 discloses a cleaning method and apparatus using an acoustic transducer. It is disclosed that the method may be used to clean a surface submerged in an underwater environment, such as a ship hull. In this specification, the term 'hull' is used to mean a hull or a vessel, or any other submerged surface such as a piling, pier, girder, support, civil engineering structure or infrastructure, window etc. However, there is still a need for an improved apparatus and method for prevention and treatment of marine biofouling.

In a paper entitled "Bubbles versus biofilms: a novel method for the removal of marine biofilms attached on antifouling coatings using an ultrasonically activated water stream", by M. Salta et al (the senior co-author being the present inventor), in Surface Topography: Metrology and Properties (Surf. Topogr.; Metrol. Prop.) 4 (2016) 034009, it is disclosed that a stream of water surrounded by air was directed against marine biofilms attached on antifouling coatings. However, that method, in which a stream of water is entirely surrounded by air, cannot be used to treat surfaces in an underwater environment.

The present invention aims to provide an apparatus for prevention and treatment of marine biofouling and a method of prevention or treatment of marine biofouling which at least partially overcome the above-mentioned disadvantages.

SUMMARY OF THE INVENTION

A first aspect of the invention provides an apparatus for prevention and treatment of marine biofouling on a surface to be treated by the apparatus, the apparatus comprising: a body defining a cavity, the body terminating in a distal open end that is adapted, in use, to be in the vicinity of a surface to be treated such that the surface forms a first end wall of a chamber within the cavity; an acoustic transducer mounted within the cavity to form an opposite second end wall of the chamber, the acoustic transducer being adapted to introduce acoustic energy into the chamber which is directed from the second end wall towards the first end wall thereby to allow acoustic pressure fluctuations to be generated at the surface to be treated, the acoustic pressure fluctuations being sufficient to cause cleaning of the surface to be treated; and a reservoir for a liquid, the reservoir being located laterally to the chamber and including an inlet passage for liquid flow into the reservoir and a plurality of mutually spaced outlet passages for liquid flow from the reservoir into the chamber, the outlet passages at least partially surrounding the chamber in the vicinity of the distal open end.

In the preferred embodiments of the present invention, the outlet passages have an outlet end oriented towards the distal open end.

Preferably, the reservoir is laterally adjacent to the chamber. The reservoir typically at least partially surrounds the chamber, and optionally may entirely surround the chamber.

In the preferred embodiments of the present invention, the chamber is surrounded by a wall that is acoustically rigid, for sound impinging on it from the water in the chamber, whereby acoustic pressure in the water, generated by the acoustic transducer, is substantially reflected at the wall without a phase change in the pressure waveform. Typically the normal incidence acoustic pressure amplitude reflection coefficient R for acoustic pressure waves in the liquid within the chamber, on meeting the wall and reflecting from it, has a value of from +0.89 to +1, i.e. from 80 to 100% of the acoustic energy is reflected, and the phase change in the pressure waveform in the liquid adjacent to the wall has a value of approximately 0°, i.e. the incident and reflected acoustic energy waves are approximately 100% in phase in the liquid adjacent to the wall (the phase change is "approximate" because there is some tolerance on the phase change; for example the phase change may be 0°+/−20% and the incident and reflected acoustic energy waves may be 100%+/−20% in phase, although preferred tolerance values are lower, for example +/−10% or +/−5%). This can be achieved by designing the chamber walls (e.g. by using metal walls, or by using a plastic, glass or acrylic of the correct thickness) so that, as measured in the water next to the inner surface of the wall, a normally-incident acoustic signal reflecting from the single or multiple reflecting interfaces in that wall is reflected with the same phase as the signal reaching the wall, also as measured in the liquid at the inner surface of the wall, and the reflected and incident waves contain, as near as possible, the same energy.

Moreover, the chamber and reservoir are constructed so as to be submergible in the underwater environment to depths of up to 30 m and to be able to resist hydrostatic pressure at such depths. Furthermore, the acoustic transducer is configured to be capable of providing sufficient acoustic pressure under such hydrostatic pressures to be able to generate sufficient non-inertial cavitation of bubbles, and surface waves on bubbles, to achieve the desired surface treatment. However, setting a single drive amplitude from the transducer, to cope with the greater depths, is suboptimal at shallower depths, because the greater the hydrostatic pressure, in general the greater the acoustic pressure required to achieve the same degree of bubble activation. Therefore, if the drive amplitude required for cleaning at a greater depth is used when the device is at a much more shallow depth, it might lead to the generation of too much bubble activity on the face of the transducer. This can impede the transmission of acoustic energy away from the transducer and towards the hull. To overcome this problem, the amplitude of the field generated by the transducer can be controlled to vary with the depth of the transducer Therefore, the transducer can provide sufficient bubble activity on the hull to clean there without generating so much bubble activity on the transducer as to impede the passage of the acoustic energy towards the hull.

Preferably, the apparatus comprises at least one first gas vent for venting gas from the chamber, the first gas vent being located remote from the distal open end and/or at least one second gas vent for venting gas from the reservoir, the second gas vent being located remote from the outlet passages. The apparatus may further comprise a one-way valve in each gas vent to prevent reverse gas flow into the chamber and/or reservoir. A suction device may be coupled to each gas vent to increase gas flow through the vent away from the chamber and/or reservoir.

In the preferred embodiments of the present invention, the apparatus further comprises a cooling system for the acoustic transducer. The cooling system may comprise a coiled pipe at least partly surrounding the acoustic transducer and a coolant supply system for supplying a flow of coolant through the coiled pipe. Alternatively, the cooling system may comprise a fan for directing a flow of a fluid, such as a liquid or air, onto or into the vicinity of the acoustic transducer.

In the preferred embodiments of the present invention, the acoustic transducer is arranged, in use, to generate acoustic resonance within the chamber when the apparatus is positioned with the surface to be treated forming the first end wall of the chamber, and the acoustic transducer has an acoustic frequency and a spacing from the distal open end such that, in use, an acoustic pressure antinode in a plane wave mode (i.e. having constant phase at any given time across the part of the hull covered by the chamber, but that phase varying in time in the manner normal for a standing wave) is formed at or adjacent to the surface to be treated. Preferably, the acoustic transducer has an acoustic frequency and a spacing from the distal open end such that, in use, only one acoustic pressure antinode is formed in the chamber, which is located at or adjacent to the surface to be treated.

Tuning to a specific acoustic mode within the three-dimensional volume of the chamber requires matching the sound frequency with the dimensions and wall boundary conditions of the chamber, and the sound speed of the liquid (which can change as it changes temperature, depth, salinity, or the population of bubbles it contains). Positive feedback may be used with the precise frequency of the driver, the settings of the bubble generator, and even the distance from the hull to the transducer, to allow a mode to be excited as the bubble population changes the speed of sound in the cleaning liquid.

In the preferred embodiments of the present invention, an acoustic energy transmitting material is located in the chamber between the acoustic transducer and the outlet passages, wherein the acoustic energy transmitting material comprises a liquid or solid and has an acoustic impedance that is substantially the same as the acoustic impedance of water. Water is preferably used as the liquid to be flowed into the chamber towards the surface to be treated.

In the preferred embodiments of the present invention, the apparatus comprises a liquid conditioning unit adapted to remove bubbles from the liquid supplied to the chamber, wherein the liquid conditioning unit has an input for liquid and an output for liquid, the output being connected to the inlet passage of the reservoir.

Cleaning is achieved when there occurs, on the surface to be cleaned and ideally nowhere else, bubbles that have a radius which makes their pulsation mode of oscillation in resonance with the applied acoustic field. There is a dimensional tolerance, such that bubbles having a radius different from that resonant radius, for example with radii that are from 10-20% smaller than that resonant radius, still achieve effective cleaning. Typically this means that the liquid conditioning unit is usually adapted to remove from the liquid bubbles having a diameter of greater than 100 μm. At the surface of the sea such a bubble size is resonant at ~60 kHz.

However for a transducer of fixed frequency, which is usually the case in power ultrasonics systems like these, the radius of the bubble that is in pulsation resonance with that frequency increases as the square root of the static pressure on the bubble, so that for example at 30 m depth, the bubble diameter that is resonant at this frequency is ~200 μm. Therefore a cautious approach is to remove bubbles larger than 100 μm diameter if operating at 60 kHz.

It is to be noted that the presence of marine life in some localities may require operation at higher frequencies to avoid adverse effects, and this will commensurately require that the liquid conditioning unit remove commensurately smaller bubbles—this is because for bubbles greater than around 30 μm diameter, the radius of a bubble that is in pulsation resonance with the ultrasonic field varies approximately inversely proportional to the ultrasonic frequency.

Bubbles of this pulsation resonant size interact strongly with the sound field. That is why it is desirable to provide the bubbles on the surface to be cleaned when the sound field hits the bubbles, because it is there that they cause strong cleaning.

However if bubbles of this pulsation resonant size are present elsewhere in the body of the liquid and meet the sound field, they do not clean, but instead they absorb energy from the sound field. Therefore whilst it is desirable to provide bubbles of the pulsation resonant size present on the surface to be cleaned when the sound field hits them, such bubbles are not desired elsewhere when the sound field hits them. If the sound field is pulsed, such bubbles can be elsewhere in the device when the sound field is off, for example between acoustic pulses.

Typically, the liquid conditioning unit comprises a casing having a plurality of compartments serially located between the input and output which define a serpentine path therebetween, at least one of the compartments including a headspace at an upper part thereof for collecting gas released from liquid flowing along the serpentine path.

The removal of bubbles and conditioning of the liquid might also be achieved through use of other technology, such that it comprise at least one of a settling vessel, a filter, a physical mesh and a vortex chamber.

Preferably, the liquid conditioning unit is fitted to the body so that the headspace is oriented in a direction away from the distal open end. The liquid conditioning unit may further comprise a vent for the headspace to permit gas flow away from the upper part of the casing.

In some embodiments of the present invention, the liquid conditioning unit is fitted to the body by a gimbal mechanism to permit the liquid conditioning unit to pivot relative the body so that when the liquid conditioning unit is submerged in water the headspace is maintained in an upwardly oriented position by buoyancy of the headspace in the water.

In other embodiments of the present invention, the liquid conditioning unit is rigidly fitted above the body, the input is at an upper end of the liquid conditioning unit and the output is at a lower end of the liquid conditioning unit and communicates directly with the inlet passage of the reservoir. Preferably, the serpentine path extends downwardly from the input to the output between successive compartments of a stack of compartments and each compartment comprises a filter element. The filter element may substantially fill the respective compartment. Typically, the filter element comprises a porous open cell foam or sponge, optionally composed of a synthetic polymer. Porous metal structures, ceramics and minerals can also be used. Preferably, the compartments are annular and are mutually separated by annular walls.

In preferred embodiments of the present invention, the acoustic transducer is adapted to be driven at a frequency in the range of from 60 kHz to 140 kHz, preferably from 60 kHz to 80 kHz, for example about 70 kHz.

The present invention further provides a surface treating assembly for prevention and treatment of marine biofouling, the assembly including multiple apparatuses according to the present invention, wherein the multiple apparatuses are assembled together in a mutually adjacent or tessellated form to form a linear or two-dimensional array of a plurality of the bodies to form a linear or two-dimensional array of a plurality of a mutually adjacent or tessellated chambers, each chamber being associated with a respective acoustic transducer.

In a second aspect, the present invention provides a method of preventing or treating marine biofouling of a surface submerged in an underwater environment, the method comprising the steps of: a) providing an apparatus including a body defining a cavity, the body terminating in a distal open end; b) positioning the distal open end in the vicinity of a surface to be treated such that the surface forms an end wall of a chamber including the cavity, the surface to be treated being submerged in an underwater environment; c) supplying liquid to the chamber such that the liquid engages the surface; d) using an acoustic transducer to introduce acoustic energy into the chamber, the acoustic transducer being mounted within the cavity to form an opposite second end wall of the chamber; e) directing the acoustic energy from the second end wall towards the first end wall thereby generating acoustic pressure fluctuations at the surface, the acoustic transducer generating acoustic resonance within the chamber and forming an acoustic pressure antinode in a plane wave mode at or adjacent to the surface to be treated.

In preferred embodiments of the present invention, only one acoustic pressure antinode is formed in the chamber, which is located at or adjacent to the surface to be treated.

Preferably, the liquid supplied in step c) has been subjected to an out-gassing step which removes gas bubbles having a diameter of greater than 100 µm. In this specification the term 'out-gassing' is used to refer to the removal of bubbles (i.e. non-dissolved gas) from the liquid, and this is distinct from 'de-gassing', which means the removal of dissolved gas from the liquid. However, having been out-gassed, so that a liquid might contain no bubbles, if its circumstances change (e.g. it warms up, or is brought to a more shallow depth) then gas that was previously dissolved can come out of solution. Therefore, in some preferred embodiments of the invention it is advisable that before outgassing, an element of de-gassing (e.g. through the use of a Venturi, or heating) is applied to bring dissolved gas out of solution, and thereby form bubbles, for the out-gasser subsequently to remove.

Typically, the acoustic transducer is driven at a frequency in the range of from 60 kHz to 140 kHz, preferably from 60 kHz to 80 kHz, for example about 70 kHz.

In preferred embodiments of the present invention, the method further comprises the step, during steps d) and e), of venting gas from the chamber by a first gas vent located remote from the distal open end. Optionally, the method may further comprise applying suction to the first gas vent to increase gas flow through the vent away from the chamber.

In preferred embodiments of the present invention, in step c) the liquid is supplied from a reservoir for the liquid, the reservoir being located laterally to the chamber and including an inlet passage for liquid flow into the reservoir and a plurality of mutually spaced outlet passages for liquid flow from the reservoir into the chamber, the outlet passages at least partially surrounding the chamber in the vicinity of the distal open end. Preferably, the outlet passages have an outlet end oriented towards the distal open end to direct a plurality of liquid jets towards the surface in step c).

Typically, the chamber is surrounded by a wall that is acoustically rigid for sound impinging on it from the water in the chamber, whereby acoustic pressure in the water, generated by the acoustic transducer, is substantially reflected at the wall without a phase change in the pressure waveform.

The method may preferably further comprise the step, during steps d) and e), of venting gas from the reservoir by a second gas vent located remote from the outlet passages. Suction may be applied to the second gas vent to increase gas flow through the vent away from the reservoir.

In preferred embodiments of the present invention, the method further comprises cooling the acoustic transducer during steps d) and e), using a cooling system comprising a coiled pipe at least partly surrounding the acoustic transducer and a coolant supply system supplying a flow of coolant through the coiled pipe.

In preferred embodiments of the present invention, water is used as the liquid supplied to the chamber. Preferably, the water supplied to the chamber is simultaneously sourced from the underwater environment. Typically, the water supplied to the chamber is seawater (although if the steps in place of filtration and out-gassing do not adequately treat the water (removing chemical contaminants, bubbles etc.) to allow good cleaning, then appropriate water can be provided from another source (tank, reservoir, pipeline etc.)).

Typically, the apparatus is translationally slid over the surface during at least steps d) and e) to provide a continuous treatment action over an area of the surface which is larger than an area of the distal open end.

In preferred embodiments of the present invention, the surface submerged in an underwater environment is a ship hull.

In preferred embodiments of the present invention, the method is a method of preventing marine biofouling of the surface submerged in an underwater environment, wherein the surface to be treated is coated with a biofilm in the absence of any macroscopic biofouling. Typically, the biofilm is discontinuous. Preferably, the method is carried out in a prevention protocol in which steps b) to e) are repeated in plural successive treatment cycles separated by a period of from 72 to 240 hours optionally from 120 to 240 hours. Typically, the surface is composed of a material selected from a metal, such as steel or aluminium, a polymer or plastics material, a rubber or a fibre-reinforced polymeric resin matrix composite material a ceramic material, a wood material or concrete. In some embodiments, the surface is a bare surface of the material which has not been pre-coated with an anti-fouling paint or a biocide. However, in alternative embodiments, the surface has been pre-coated with an anti-fouling paint or a biocide.

The apparatus of the invention allows acoustic energy to be delivered to a surface to be treated to provide effective and efficient treatment of the surface for prevention and treatment of marine biofouling, especially by activating gas bubbles at or near to the surface. The activation of gas bubbles preferably comprises using the acoustic energy to cause non-inertial cavitation of gas bubbles at, or near to, the surface. If required for some purposes (e.g. the removal of established biofouling), inertial cavitation can be generated on the surface by increasing the power supplied to the transducer.

The distal end of the body may be slightly spaced from the surface to be treated in use, or may directly engage the surface. Such a spacing is typically up to 2 mm, for example from 0.5 to 2 mm, more typically from 0.5 to 1.5 mm, such as about 1 mm.

The formation of an acoustic pressure antinode at or adjacent to the surface allows efficient energy transfer from the acoustic transmitter to the surface, thereby minimising the power requirements of the apparatus and minimising transducer heating. An acoustic pressure antinode may be generated at the surface when the surface acts as an acoustically rigid boundary (as seen by the sound field in the water) or an approximately acoustically rigid boundary (as seen by the sound field in the water) such that it reflects acoustic pressure waves that are in the liquid adjacent to the wall and impinge upon it, substantially without a change in phase.

Whilst the sound field in the water can readily achieve a normal incidence pressure amplitude reflection coefficient R of close to 1 (as seen by the sound field in the water) for metal ship hull materials, the value of R is less for others (plastics, fibre-glass and epoxy, and other fibre reinforced resin matrix composite materials) and indeed the rubber coating of many submarines is designed to give close to R=0. This does not preclude the establishment of an acoustic pressure amplitude across the surface of the material of the hull that the chamber sits over or against, because such establishment is also based on the spacing between that hull and the transducer, and this can be controlled to place a region of high acoustic pressure oscillations (resembling an acoustic pressure amplitude) in the water adjacent even to absorbent rubber, by appropriate choice of the chamber size—this process is facilitated if the walls of the chamber are acoustically rigid as seen by the sound field in the liquid.

Preferably there is only one antinode, which is at or adjacent to the surface to be cleaned; if other antinodes are present between the surface to be cleaned and the acoustic transducer, this may cause bubbles to accumulate at the antinode which would led to acoustic attenuation in the chamber, and reduce the acoustic pressure at the surface to be treated, which would reduce the effectiveness of the treatment.

The body (and chamber) may, for example, be in the form of a circular, oval, triangular, square, rectangular, pentagonal, hexagonal etc. cylinder or prism. The cylinder or prism may have any number of sides.

The cross-section of the body and/or the cavity may be constant along a length of the body (in a direction perpendicular to the surface to be treated in use), or alternatively may vary along the length of the body. The body (and chamber) may, for example, be in the form of a truncated cone, or a truncated pyramid, or a straight or curved horn, or a hemisphere, or another form of dome. Other shapes are possible.

The body (and chamber) may have a diameter or lateral width (in a direction parallel to the surface in use) in the range of 5 mm to 1 m, or 10 mm to 150 mm, or 20 mm to 100 mm. Other dimensions are possible.

The chamber may have and a length (in a direction perpendicular to the surface in use) in the range of 10 mm to 140 mm, or 20 mm to 120 mm, or 60 mm to 100 mm. Other dimensions are possible. In one particular preferred embodiment the length is 100 mm. It should be noted that the length of the body may be less than the length of the chamber in embodiments in which the surface to be treated extends outwardly from the distal end of the body.

The body may be formed of, for example, a metal, such as steel or aluminium, or a polymeric material such as an acrylic material.

In one preferred embodiment of the present invention, the body has a rectangular or square cross-section and is formed of a polymeric material. A polymeric material is lighter than a metal and provides a more lightweight device which is easier to support and manipulate in an underwater environment.

In preferred embodiments of the present invention, the body has a regular external shape, for example having a rectangular or square cross-section, or any other prismatic shape, so that a plurality of the bodies, can be assembled together in a mutually adjacent or tessellated form to form a linear or two-dimensional array of the plurality of bodies. Correspondingly there is provided a linear or two-dimensional array of a plurality of a mutually adjacent or tessellated chambers, each chamber being associated with a respective acoustic transducer. This array can provide an apparatus for treating a surface which can have an overall shape and dimensions which are matched to the surface to be treated, for example a linear array for treating an elongate linear surface or a two-dimensional array for treating a large surface area. This provides a more efficient unitary apparatus for treating a surface which has plural closely adjacent chambers defined by respective bodies, with each chamber having acoustic energy introduced therein by a respective acoustic transducer. Each chamber/acoustic transducer assembly is configured to provide high quality or optimised treating for the surface, and the array provides an enlarged composite treating apparatus for increased treating efficiency.

Whilst several transducers can be used to generate the sound field in a single chamber, care must be taken to ensure they emit in phase. If the phases of the signals emitted by multiple transducers is not carefully controlled, then the inclusion of internal walls that acoustically isolate them (so that there is effectively one transducer per chamber) serves a useful purpose. Such acoustic isolation can be achieved by using walls that reflect most of the acoustic energy in the water, back into the water from which the acoustic energy came. If multiple transducers emit signals into the same volume, then unless the phases of the signals emitted by the transducers are carefully controlled (which usually means synchronized unless some deliberate beam steering or focusing is being sought), there may be unpredictable areas of high oscillatory pressure variation (where cleaning is great; these may be called 'hot spots'), and other regions of low oscillatory pressure variation (where cleaning is small; these may be called 'cold spots').

Such a phenomenon is common in ultrasonic cleaning baths, which are often powered by multiple transducers. This could happen in both cleaning baths and in the present device if the manufacturer sends the same electrical signal to a set of nominally-identical transducers, but because of slight discrepancies between the construction and loading of the various transducers, they have slightly different resonance frequencies. Because the phase response (as a function of frequency) of a driven oscillator changes dramatically at resonance (changing by Pi radians) and because this change happens over a small frequency range for lightly damped oscillators like power transducers, then if several transduces having slightly different builds, and therefore slightly different resonance frequencies, are driven with the same electrical signal, they will emit signals with different phases, unless care is taken to correct the phase of the signals they emit. This can result in the presence of 'hot' and 'cold' spots, and sub-optimal cleaning.

If measures are taken to ensure all transducers emit with the same phase, cleaning can be enhanced, but if no such checks are made and the transducers emit with some phase differences from one another, then the inclusion of walls which appear (to acoustic signals impacting them from the water) to be acoustically rigid isolates the liquid volumes insonified by each transducer from one another, and so immunizes the liquid from sub-optimal cleaning caused by slight differences in the resonance frequencies of nominally identical transducers.

An upper portion of the chamber between the acoustic transduce and the outlet passages may comprise an acoustic energy transmitting material which comprises a different material to the treating liquid and has an acoustic impedance that is similar to an acoustic impedance of the treating liquid, for example water. The acoustic energy transmitting material may, for example, comprise a solid or gel material with a similar acoustic impedance to that of the treating liquid. The acoustic energy transmitting material may, for example, comprise an agar gel or gelatine, or a polymer, rubber, composite, or plastic of acoustic impedance similar to that of water.

The treating apparatus may comprise a plurality of the acoustic transducers located and oriented within the chamber such that acoustic energy generated by the plurality of transducers in use is focused on the surface to be treated. Each acoustic transducer may be oriented and located to face towards a common point. The plurality of acoustic transducers may be operated with phase delays to produce focusing or beam steering effects.

In some embodiments of the present invention, a plurality of outlet passages in the reservoir allow treating liquid to be jetted from the reservoir into the chamber at a location above the surface. The plurality of holes may be provided in a regular or irregular array. The provision of such an array of holes has been found to provide enhanced treating of the surface. It has been found that for a given volume flow rate (e.g. litres per minute) of treating liquid through the holes, by directing the liquid flow at the surface to be treated, through a plurality of holes, enhances the treating effect.

The flow rate from the reservoir of treating liquid into the chamber may be controlled or selected to provide enhanced treating, for example, the treating effect may be enhanced at faster flow rate, resembling a higher velocity liquid jet rather than a slow velocity liquid bleed, especially if the jet is directed onto the surface to be treated. The treating effect may also be enhanced if the feed of liquid into the chamber is directed downwards. Such a liquid feed directly into the chamber may provide enhanced treating at higher flow velocity and if the flow is directed downwards onto the surface to be treated. Typically, the flow velocity of the liquid flow into the chamber, and optionally directed towards the surface to be treated, is from 0.25 to 5 metres per second, for example from 0.5 to 2 metres per second, e.g. about 1 metre per second.

The apparatus may comprise a liquid conditioning unit adapted to remove bubbles from the treating liquid supplied to the chamber. The liquid conditioning unit may substantially reduce the number of bubbles present in the treating liquid entering the chamber, which would otherwise attenuate the acoustic field. The liquid conditioning unit may be arranged upstream of the treating liquid inlet to remove bubbles from the treating liquid before the treating liquid is supplied to the chamber.

The apparatus may comprise a modulator to provide an amplitude or frequency modulation of the pulses of acoustic energy.

In a preferred embodiment, the acoustic transducer is adapted to be driven at a frequency in the range of range from 60 to 140 kHz, preferably from 60 kHz to 80 kHz, for example about 70 kHz. This range is referred because when water is used as the liquid within the chamber the speed of sound in water means that the dimensions of the chamber to provide a single antinode at or near the surface are within the preferred range described above. Also, such a frequency range does not damage marine life or affect the hearing humans present in the water, for examples divers treating a ship hull using the apparatus underwater.

The pulses of acoustic energy may be controlled to enhance bubble removal from the chamber. It has been found that whilst the acoustic energy is turned off, bubbles can rise out of the cavity of the chamber towards the vents. Accordingly, an off-time between acoustic energy pulses can help remove bubbles from the chamber, which bubbles may otherwise attenuate the sound field and reduce the treating. When the acoustic energy is on, some bubbles are prevented from rising out of the chamber by Bjerknes forces, and so an off-time between acoustic energy pulses can help flow and buoyancy remove the bubbles. Yet another advantage of acoustic energy pulsing is that at the commencement of a subsequent pulse, in the time window around the start of that pulse there are many frequencies present (as shown by Fourier transform of the start of a pulse). It has been found that for that short period after each pulse starts, bubbles which have sizes that are far from achieving resonance within the sound field, can respond to some energy that is present at the start of the pulse. As such, for example, it has been found that the start of the pulse can provide to large bubbles sticking to the surface being treated a small impulsive force, or 'kick', which can knock the bubbles from the surface. Accordingly, by pulsing the sound field (particularly with a pulse waveform that has sudden starts as for example is provided when the envelope of the carrier wave is in the form of a square wave), it has been found that some of the unwanted bubbles (particularly large bubbles) that are attached to the surface can be dislodged, thereby enhancing the treating efficiency of the apparatus.

Walls of the chamber are preferably formed of a material, or series of materials, such that a normal incidence acoustic pressure amplitude reflection coefficient of $R=+1$ (or close to it, for example between $R=+0.89$ and $R=+1$) is observed by the sound field in the liquid when it is incident upon this chamber. This can be caused by metal walls of thickness in excess of 2 mm.

Alternatively, if the sound field substantially penetrates the wall but is not substantially absorbed by the material of the wall, a reflection coefficient of $R=+1$ can be generated with respect to the sound in the water approaching the inner chamber wall, as a result of the path difference traveled between the inner and outer boundaries in the wall, and the phase changes that occur on transmission of the sound across the boundary between the chamber liquid and the inner edge of the wall, and the phase change that occurs on reflection of the sound in the wall off the interface between the chamber wall and the fluid outside.

Designing a value of $R=+0.89$ to $+1.0$ into the reflection experienced by the sound field in the liquid at the chamber wall, is preferred in order to maximise the area treated by the apparatus up to the edges of the chamber. The material may, for example, be a metal. Alternatively a transparent plastic, glass or acrylic material may be selected in order to allow inspection of the chamber in use, although performance may be optimized if there is a relationship between the wall thickness, the ultrasonic frequency, sound speed, and acoustic impedance of the wall material, as described in the previous paragraph in order to take account of the phase changes that occur on transmission through and reflection at the interfaces between the chamber wall and the adjacent fluid, and the phase change incurred by the two-way path difference during propagation through the wall.

The apparatus may comprise a chemically active agent introduction system for introducing one or more chemically active agents. The chemically active agent may include, for example, a detergent, a surfactant and/or a biocide. A surfactant may improve control of bubble diameters by reducing the likelihood of bubble coalescence.

The distal end of the body may be substantially planar. The apparatus may therefore be particularly suited to treating a substantially planar surface. Alternatively the distal end of the body may have some other shape adapted to treat a surface having a corresponding shape. The apparatus may be provided with casters for positioning, and translating, the apparatus relative to the surface to be treated.

Acoustic cavitation occurs when a bubble that is surrounded by liquid changes volume under the action of a varying pressure field. Bubble volume change is oscillatory, but can sometimes last for less than one oscillation. During non-inertial bubble motion, perturbations in the bubble gas pressure (rather than the liquid inertia) control the dynamics of the pulsation. In response to activation by a sound field, bubble oscillation occurs that can include both volume-changing oscillations (pulsations) and oscillations that do not, to first order, change the bubble volume, but perturb the bubble wall in a non-spherical manner, the most well-known of which is the Faraday wave.

Cleaning can occur when the Faraday wave, either with or without other higher order modes, are excited on the bubble wall once the acceleration of the bubble wall during pulsation exceeds a threshold value. This is a form of non-inertial cavitation. When the driving ultrasonic field has an amplitude that is lower than the amplitude required to excite the Faraday wave, bubble pulsation still occurs, but without sustained shape oscillations. This is also a form of non-inertial cavitation. Non-inertial bubble motion and non-inertial cavitation include a range of phenomena, including the generation of surface waves on the bubble wall, microstreaming fluid currents in the treating liquid and/or shear in the treating liquid, radiation force (especially primary and secondary Bjerknes force) effects, acoustically-driven bubble fragmentation and coalescence, bubble motion under acoustic radiation forces, and spherical pulsation with an amplitude insufficient to generate inertial collapse.

During inertial cavitation, the pulsation amplitude of the bubble becomes so large that, on subsequently collapse, the bubble motion is dominated by the inertia of the liquid, which causes substantial overshoot during collapse so that the collapse continues well after the bubble passes through its equilibrium size, and the gas inside is compressed to achieve temperatures of several thousand kelvin. Shock waves can be emitted from the bubble wall after the moment of minimum size, and the bubble can involute and form a high speed liquid jet which passes through the centre of the bubble, and which produces a blast wave when it impacts the downstream wall of the bubble. Inertial cavitation can cause erosion in solid materials.

BRIEF DESCRIPTION OF FIGURES

Embodiments of the present invention will now be described by way of example only, with reference to the accompanying drawings, in which.

DESCRIPTION OF EMBODIMENTS OF THE INVENTION

Figure 1:
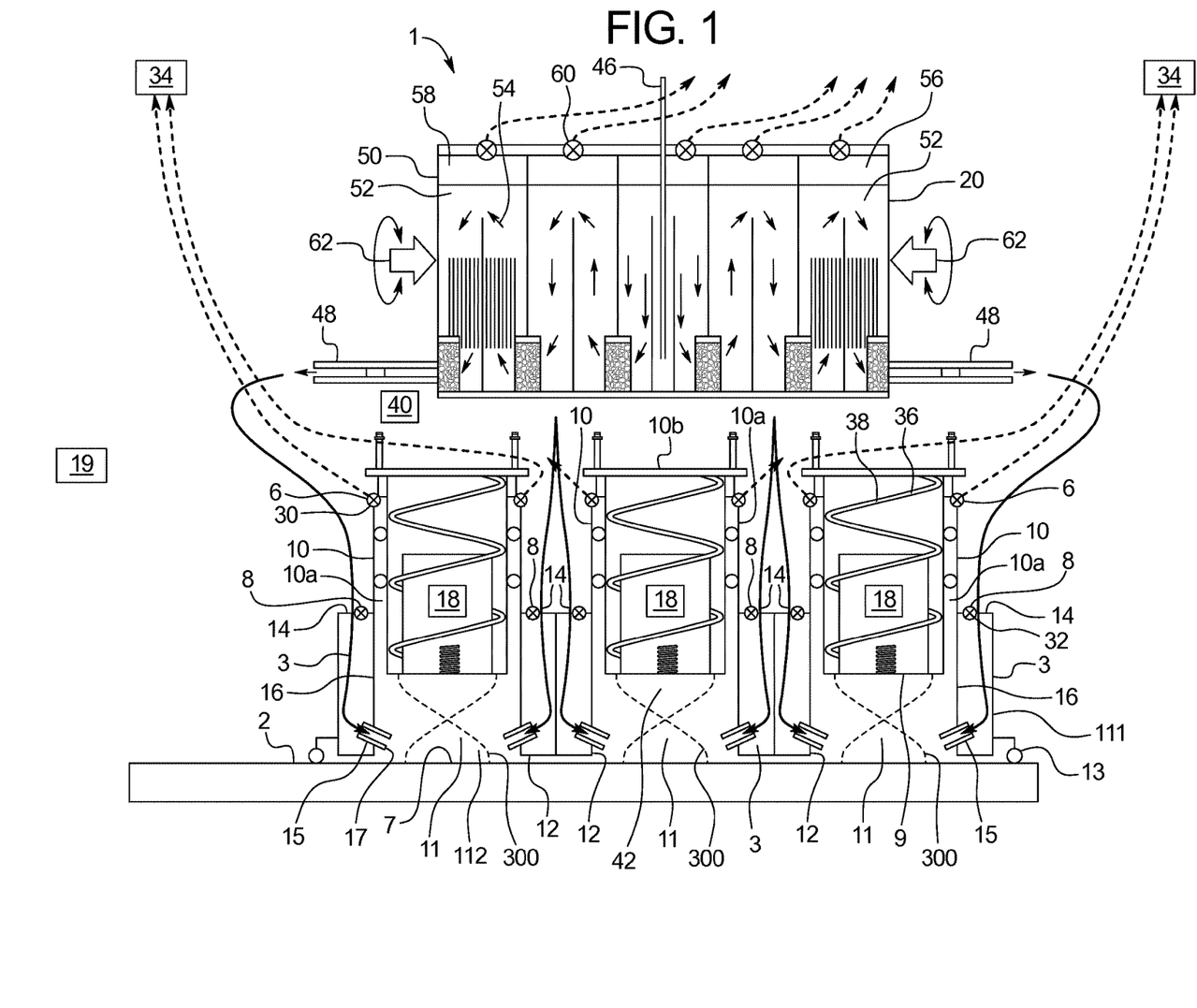
FIG. 1 illustrates an apparatus for prevention and treatment of marine biofouling according to a first embodiment of the present invention.

FIG. 1 shows a treating apparatus 1, for prevention and treatment of marine biofouling on a surface to be treated by the apparatus, in accordance with an embodiment of the present invention. The apparatus 1 comprises a metal, for example steel or aluminium, or polymeric, for example acrylic, body 10 defining a cavity 10a in the form of a circular, square or rectangular cylinder. The body 10 terminates in a planar distal open end 12 that is, in use, held in the vicinity of a planar surface 2, which is the surface to be treated by the apparatus), as shown in FIG. 1.

When the body 10 is held with the distal end 12 of the body 10 in the vicinity of the surface 2, the surface 2 forms a first end wall 7 of a chamber 11 within the cavity 10a. The body 10 is provided with casters 13 for positioning the apparatus 1 relative to the surface 2.

The apparatus 1 further comprises a supply of a treating liquid such as water which can be supplied to the chamber 11 from a treating liquid reservoir 3. The reservoir 3 is located laterally to the chamber 11 and includes an inlet passage 14 for liquid flow into the reservoir 3 and a plurality of mutually spaced outlet passages 15 for liquid flow from the reservoir 3 into the chamber 11. The outlet passages 15 at least partially surround the chamber 11 in the vicinity of the distal open end 12. The outlet passages 15 have an outlet end 14 oriented towards the distal open end 12. The reservoir 3 is laterally adjacent to the chamber 11. The reservoir 3 preferably at least partially surrounds the chamber 11, and most preferably entirely surrounds the chamber 11. The chamber 11 is surrounded by a wall 16, typically a common wall 16 between, and separating, the chamber 11 and the reservoir 3, which is acoustically rigid as seen by the sound field within the liquid in the chamber, whereby, in use, acoustic pressure waveforms in the water in the chamber 11 are substantially reflected at the wall without a phase change. Typically, for acoustic waves in the liquid in the chamber that are approaching the wall to then be reflected off it, the normal incidence pressure amplitude reflection coefficient R of the wall 16 has a value of from +0.89 to +1, i.e. from 80 to 100% of the acoustic energy is reflected, and the phase change in the pressure waveform adjacent to the wall has a value of approximately 0°, i.e. the incident and reflected acoustic pressure waves are approximately 100% in phase in the chamber liquid adjacent to the wall (with a tolerance in the phase change of up to +/−20% or lower as described above).

At least one first gas vent 6 is provided for venting gas from the chamber 11. The first gas vent 11 is located remote from the distal open end 11. At least one second gas vent 8 is provided for venting gas from the reservoir 3, the second gas vent 8 being located remote from the outlet passages 15. A one-way valve 30, 32 in each gas vent 6, 8 prevents reverse gas flow into the chamber 11 and/or reservoir 3. A suction device 34 may be coupled to each gas vent 6, 8 to increase gas flow through the vent 6, 8 away from the chamber 11 and/or reservoir 3.

An acoustic transducer 18 is mounted within the cavity 10*a* on the top wall 10*b* of the body 10. The acoustic transducer 18 forms an opposite second end wall 9 of the chamber 11, and is adapted to introduce acoustic energy into the chamber 11 which is directed from the second end wall 9 towards the first end wall 7 thereby to allow acoustic pressure fluctuations to be generated at the surface 2 to be treated. The acoustic transducer 18 is controlled by a controller 19 and can be driven at a frequency of 60 kHz to 140 kHz, preferably from 60 kHz to 80 kHz, for example about 70 kHz. A modulator allows amplitude or frequency modulation of pulses of acoustic energy. Acoustic isolation devices (not shown) in the treating liquid inlet 14 and the treating liquid outlet 15 prevent sound propagation out from the chamber 11.

FIG. 1 shows an assembly including multiple apparatuses 1 according to the present invention, wherein the multiple apparatuses 1 are assembled together in a mutually adjacent or tessellated form to form a linear or two-dimensional array 111 of a plurality of the bodies 10 to form a linear or two-dimensional array 112 of a plurality of a mutually adjacent or tessellated chambers 11, each chamber 11 being associated with a respective acoustic transducer 18.

A cooling system 36 for the acoustic transducer 18 comprises a coiled pipe 38 at least partly surrounding the acoustic transducer 18. A coolant supply system 40 supplies a flow of coolant through the coiled pipe 38. Typically, the coolant is water, such as seawater, sourced from the underwater environment. Alternatively, the cooling system comprises a fan for directing a flow of a fluid, such as air or a liquid, onto or into the vicinity of the acoustic transducer 18. When the fan is arranged for driving a liquid flow, there is a need to ensure electrical safety between the liquid and the electrical power supply to the transducer, through insulation or use of a thermally conducting but electrically insulating liquid such as a transformer oil.

The acoustic transducer 18 is arranged, in use, to generate acoustic resonance within the chamber 11 when the apparatus 1 is positioned on or adjacent to a surface 2 (as shown in FIG. 1) with the surface 2 to be treated forming the first end wall 7 of the chamber 11 and the chamber 11 is filled with treating liquid. The acoustic transducer 18 has an acoustic frequency and a spacing from the distal open end 12 such that, in use, an acoustic pressure antinode in a plane wave mode is formed at or adjacent to the surface 2 to be treated. Preferably, the acoustic transducer 18 has an acoustic frequency and a spacing from the distal open end 12 such that, in use, only one acoustic pressure antinode is formed in the chamber 11, which is located at or adjacent to the surface 2 to be treated.

The acoustic transducers 18 are driven by a transducer drive system. A phase controller may be connected to the transducer drive system for providing that the plurality of acoustic transducer emit acoustic energy in phase with each other. Additionally or alternatively, each chamber may be acoustically isolated from any adjacent chamber, for example by providing each chamber with acoustically rigid walls.

In use, liquid flowed into the chamber 11 from the outlet passages 15 may entirely fill the chamber 11. Alternatively, an acoustic energy transmitting material 42 may be located in the chamber 18 between the acoustic transducer 18 and the outlet passages 15. The acoustic energy transmitting material 42 may comprise a liquid or solid and has an acoustic impedance that is substantially the same as the acoustic impedance of the liquid flowed into the chamber 11 from the outlet passages 15, most typically water. Water is preferably used as the liquid to be flowed into the chamber 11 towards the surface 2 to be treated.

A liquid conditioning unit 20 is located upstream of the treating liquid inlet 14, and is adapted to remove bubbles from the treating liquid supplied to the chamber 11, which would otherwise attenuate the acoustic field within the chamber 11. It can also filter particulates and other contaminants from the liquid. The liquid conditioning unit 20 has an input 46 for liquid and an output 48 for liquid, the output 48 being connected to the inlet passage 14 of the reservoir 3. The liquid conditioning unit 20 is typically adapted to remove from the liquid bubbles having a diameter of greater than 100 μm.

Typically, the liquid conditioning unit 20 comprises a casing 50 having a plurality of compartments 52 serially located between the input 46 and output 48 which define a serpentine path 54 therebetween. At least one of the compartments 52 includes a headspace 56 at an upper part 58 thereof for collecting gas released from liquid flowing along the serpentine path 54. The input 46 is located at the centre of the plurality of compartments 52 and the output 48 is located at a periphery of the plurality of compartments 52. The volume of the compartments 52 of the plurality of compartments 52 increases in a flow direction from the input 46 to the output 48 so that the flow rate decreases in the flow direction.

The liquid conditioning unit 20 is fitted to the body 10 so that the headspace 56 is oriented in a direction away from the distal open end 12. The liquid conditioning unit 20 may further comprise a vent 60 for the headspace 56 to permit gas flow away from the upper part 58 of the casing 50.

In some embodiments of the present invention, as shown in FIG. 1, the liquid conditioning unit 20 is fitted to the body 10 by a gimbal mechanism 62 to permit the liquid conditioning unit 20 to pivot relative the body 10 so that when the liquid conditioning unit 20 is submerged in water the headspace 58 is maintained in an upwardly oriented position by buoyancy of the headspace 58 in the water.

Figure 2:
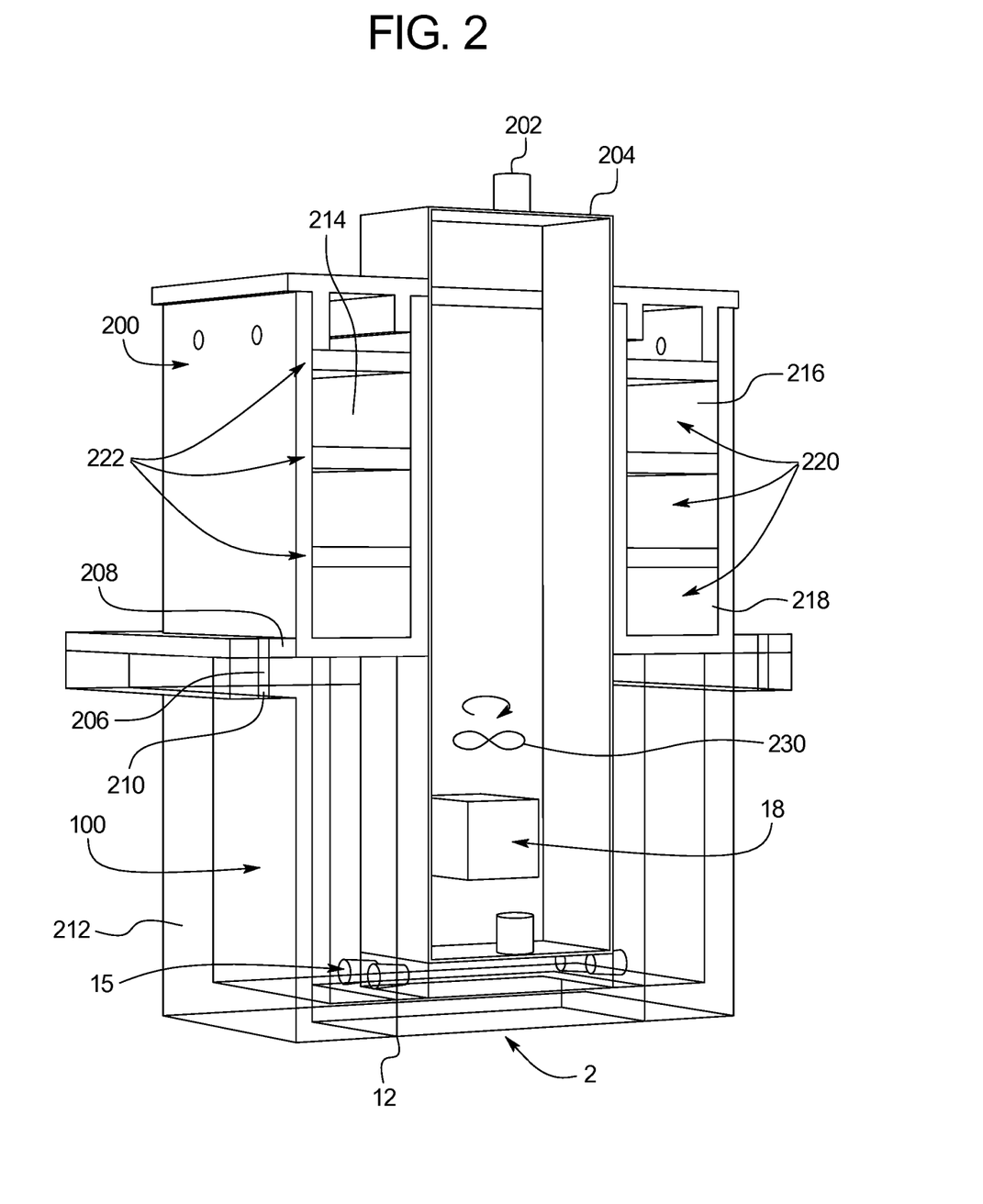
FIG. 2 illustrates an alternative apparatus for treating a surface according to a second embodiment of the present invention.

In other embodiments of the present invention, as shown in FIG. 2, the liquid conditioning unit 200 is rigidly fitted above the body 100. The input 202 is at an upper end 204 of the liquid conditioning unit 200 and the output 206 is at a lower end 208 of the liquid conditioning unit 200 and communicates directly with the inlet passage 210 of the reservoir 212. The serpentine path 214 extends downwardly from the input 202 to the output 206 between successive compartments 216 of a stack 218 of compartments 216. Each compartment 216 comprises a filter element 220. The filter element 220 may substantially fill the respective compartment 216. Typically, the filter element 220 comprises a porous open cell foam or sponge, optionally composed of a synthetic polymer, metallic mesh or mineral, or porous ceramic or stone. Preferably, the compartments 216 are annular and are mutually separated by annular walls 222.

FIG. 2 also illustrates a fan 230 for directing a flow of a fluid, which is an electrically insulating liquid such as a transformer oil, onto or into the vicinity of the acoustic transducer 18.

In other embodiments of the present invention, the liquid conditioning unit comprises a vortex chamber. The vortex chamber may be fitted to the body by a gimbal mechanism to permit the vortex chamber to pivot relative the body so that when the vortex chamber is submerged in water a headspace in the vortex chamber is maintained in an upwardly oriented position by buoyancy of the headspace in the water.

A liquid degasser may be provided upstream of the inlet of the liquid conditioning unit which is adapted to remove dissolved gas from the liquid.

An aggressive or chaotropic agent introduction system can be used to introduce one or more aggressive or chaotropic agents into the chamber 11, for example ozone, chlorine and/or hydrogen peroxide. A chemically active agent introduction system can be used to introducing one or more chemically active agents into the treating liquid, for example a detergent, a surfactant and/or a biocide.

Operation of the apparatus will now be described.

In use, the apparatus is used in a method of preventing or treating marine biofouling of a surface submerged in an underwater environment. In preferred embodiments of the present invention, the surface submerged in an underwater environment is a ship hull. It can also treat areas of the hull that are close to the waterline, and so can suffer from biofouling as a result of intermittent submersion, which is particularly facilitated if the outer walls of the device are made to be acoustically rigid whether submerged or not (as discussed above, metal walls more than 2 mm thick are acoustically rigid). In some embodiments, the method is a method of preventing marine biofouling of the surface submerged, permanently or intermittently, in an underwater environment, wherein the surface to be treated is coated with a biofilm in the absence of any macroscopic biofouling. The biofilm may be continuous or discontinuous.

In other embodiments, the method is a method of preventing marine biofouling of the surface submerged, permanently or intermittently, in an underwater environment, wherein the surface to be treated is coated with macroscopic biofouling.

Typically, the surface is composed of a material selected from a metal, such as steel or aluminium, a polymer, a rubber or a fibre-reinforced polymeric resin matrix composite material. In some embodiments, the surface is a bare surface of the material which has not been pre-coated with an anti-fouling paint or a biocide. However, in other embodiments the surface has been pre-coated with an anti-fouling paint or a biocide.

In the method, the apparatus described above is provided and the distal open end 12 is positioned in the vicinity of the surface 2 to be treated such that the surface 2 forms an end wall 9 of the chamber 11. The distal open end 12 of the body 10 may be slightly spaced from the surface to be treated in use, or may directly engage the surface 2. Such a spacing is typically up to 2 mm, for example from 0.5 to 2 mm, more typically from 0.5 to 1.5 mm, such as about 1 mm.

Liquid is supplied to the chamber 11 through the outlet passages 15 such that the liquid engages the surface 2. Preferably, the liquid has been subjected to an outgassing step which removes gas bubbles that are larger than the bubble size which is in pulsation resonance with the ultrasonic field (i.e. typically having a diameter of greater than 100 µm). The outgas sing step may optionally be preceded by a de-gassing step to remove dissolved gas from the liquid, as described above.

In preferred embodiments of the present invention, water is used as the liquid supplied to the chamber 11. Preferably, the water supplied to the chamber 11 is simultaneously sourced from the underwater environment. Typically, the water supplied to the chamber 11 is seawater.

The acoustic transducer controller 19 is used to control the acoustic transducer 18, and may be configured to generate pulses of acoustic energy. In this way it is possible to operate the transducer more efficiently by only generating acoustic energy in pulses and by reducing attenuation caused by bubbles. Typically, the acoustic transducer 18 is driven at a frequency in the range of from 60 kHz to 140 kHz, preferably from 60 kHz to 80 kHz, for example about 70 kHz. A frequency of about 70 kHz produces a bubble radius of typically about 40 to 45 µm in water close to the sea surface.

The zero-to-peak pressure amplitude can be controlled by the controller 19 to provide non-inertial bubble motion and non-inertial bubble cavitation. If desired, and unwanted surface damage is not a significant factor, the power emitted may be sufficiently high to stimulate inertial cavitation. The ultrasound frequency and the amplitude can be modified to modify the range of bubble sizes and the number of bubbles, and thereby also the acoustic pressure on the surface and the strength of the treatment. The acoustic transducer 18 may be operated to control the acoustic energy in the chamber 11 to generate surface waves in the bubbles and/or microstreaming. Surface waves may be controlled by varying the zero-to-peak pressure amplitude and/or the ultrasound frequency and/or bubble size. In general, the closer a bubble is to its pulsation resonance size, the lower the threshold acoustic pressure required to excite the Faraday wave (and other related waves). The sound field may be continuous or alternatively amplitude or frequency modulated, and the treating operation may comprise employing modulated acoustic energy to cause the non-inertial bubble motion and/or inertial cavitation and/or to generate the surface waves and/or microstreaming.

The acoustic transducer 18 therefore introduces acoustic energy into the chamber 11 and acoustic energy from the acoustic transducer is directed towards the first end wall 7 thereby generating acoustic pressure fluctuations at the surface 2 which are sufficient to cause cleaning of the surface 2. The acoustic transducer 18 generates acoustic resonance within the chamber 11 and, as shown in FIG. 1, forms an acoustic pressure antinode 300 in a plane wave mode (i.e. with constant phase, at any given time, across the surface to be treated) at or adjacent to the surface 2 to be treated. The acoustic pressure causes bubbles to form in the liquid at or in the vicinity of the surface 2. The acoustic pressure generates non-inertial cavitation of the bubbles within the liquid which treat the surface 2 to prevent or treat marine biofouling. Preferably, only one acoustic pressure antinode 300 is formed in the chamber 11, which is located at or adjacent to the surface 2 to be treated. This reduces attenuation of the acoustic energy by bubbles that would otherwise collect in the vicinity of any antinode remote from the surface 2.

The bubbles may rise within the chamber 11 and the reservoir 3 and be vented by the first and second vents 6, 8, optionally under suction to increase gas flow through the vents 6, 8 away from the chamber, as described above. The gas venting may be controlled to permit the apparatus to be oriented in any direction or attitude while in use, since the surface to be treated in the underwater environment, or just above the underwater environment if treating fouling on an intermittently fouled surface, may include a variety of regions of different orientation.

The chamber 11 and reservoir 2 are constructed of robust, stress resistant materials so as to be submergible in the underwater environment to depths of up to 30 m and to be able to resist hydrostatic pressure at such depths. Furthermore, the acoustic transducer 18 is configured to be capable of providing sufficient acoustic pressure under such hydrostatic pressures to be able to generate sufficient non-inertial cavitation of bubbles, and surface waves on bubbles, to achieve the desired surface treatment, and inertial cavitation if that is desired.

When treating marine biofouling, any microscopic or macroscopic biofouling is removed from the surface by a cleaning effect resulting from non-inertial cavitation of bubbles at or in the vicinity of the surface 2. If desired, and unwanted surface damage is not a significant factor, the power emitted may be sufficiently high to stimulate inertial cavitation. In both cases, the treatment is carried out for sufficient time to remove the microscopic or macroscopic biofouling in a treatment cycle.

Alternatively, the method is carried out in a prevention protocol to prevent marine biofouling in which the steps of the method forming a treatment cycle are repeated in plural successive treatment cycles separated by a period of from 72 to 240 hours, optionally from 120 to 240 hours. These successive treatments could, for example, be carried out whilst a ship is stationary in harbour, by mounting the device on a vehicle or arm that circles the vessel, possibly autonomously, covering ('painting out') successive rows one above the other (or side by side), touching or overlapping each other, until it has covered the whole hull, at which point it then returns to start painting the hull again, repeating its original path. This would allow a regular short-duration treatment of every region of the ship whilst it was in harbour, for example by a robot vehicle, which prevents the particular problem of biofilm and foulant build-up whilst the vessel is stationary in harbour (as merchant, naval surface ships and submarines are for extended periods).

It has been surprisingly found by the present inventors that the method of the present invention can prevent marine biofouling of the surface submerged in an underwater environment, wherein the surface to be treated is coated with a biofilm in the absence of any macroscopic biofouling. The biofilm may be continuous or discontinuous. In its early stages, the biofilm is also typically invisible to the naked eye, particularly during underwater inspections by divers or cameras. What has also been surprisingly found by the present inventors that the marine biofouling can be prevented when the surface is composed of a material selected from a metal, such as steel or aluminium, a polymer, a rubber or a fibre-reinforced polymeric resin matrix composite material and typically also when the surface is a bare surface of the material which has not been pre-coated with an anti-fouling paint or a biocide.

In other words, it has been surprisingly found that a prevention protocol of repeated treatment cycles at a desired frequency can prevent biofouling even when any continuous or discontinuous biofilm present is invisible to the naked eye and even when the surface is composed of a material typically used to produce ship hulls may be a bare surface of the material which has not been pre-coated with an anti-fouling paint or a biocide. Whilst the device also works with surfaces treated with antifoul, the ability to prevent fouling by attacking the biofilm on surfaces that do not have antifoul brings rewards in terms of reduction of environmental pollution through the use of antifouls and biocides.

The chamber 11 is surrounded by a wall 16 that is acoustically rigid to acoustic pressure waveforms in the liquid that impinge upon it. That is to say, acoustic pressure waveforms in the liquid, as generated by the acoustic transducer 18, are substantially reflected at the wall 18 without a phase change in pressure in the liquid at the wall. This can provide that the acoustic pressure antinode can be in a plane wave mode at or adjacent to the surface 2 to be treated, which provides that the acoustic pressure antinode has uniform phase across the area of the distal open end 12 of the chamber 11, and consequently across the area of the particular area of the surface 2 that is covered by the distal open end 12 of the chamber 11 at any given moment in time.

The acoustic transducer 18 is cooled using the cooling system 36 by supplying a flow of coolant, from the coolant supply system 40, through the coiled pipe 38 which at least partly surrounds the acoustic transducer 18. Alternatively, seawater can fill or be pumped directly around the transducer to cool it, provided acoustic emissions into the seawater do not generate significant power losses.

Typically, the apparatus is translationally slid over the surface to provide a continuous treatment action over an area of the surface 2 which is larger than an area of the distal open end 12. This may be achieved manually, for example when the apparatus is held by a diver, or by using a robot or autonomous vehicle, for example with the apparatus being attached to the surface to be cleaned by suction or magnetic attraction.

The present invention is now described further with reference to the following non-limiting Examples.

Example 1

In this Example, mature biofouling was removed using an apparatus and method according to the invention. This was compared to the cleaning achieved by a mechanical rotating brush system which will be termed 'Comparative Example 1'.

The thickness of mature biofouling before and after treatment was measured at multiple sites on each tested plate using an Episcopic Differential Interference Contrast (EDIC) microscope. This microscope works by having the light source above the sample, meaning it is possible to measure growth on solid surfaces. The depth of field on an EDIC microscope is very narrow and as a result it is possible to focus on the top of the biofouling, the sample or anywhere in between. What this allows is for a technique where by focusing the microscope on the base of the sample and setting an origin, it is then possible to move the sample down until the top of the sample is then in focus. The difference between the 2 points, which is measured by the microscope is the thickness of the foulant at this point. As the foulant will not be uniformly spread over the surface of the sample it will be necessary to measure the thickness at several points. Doing this for 10 points on every plate was sufficient to give statistically significant results.

Samples of steel, aluminium and rubber plates (50 samples of each material) of surface area 10 cm×10 cm were submerged in a seawater dock for a period of 36, 41 and 50 days respectively. During this period, mature biofoulant was established on the surfaces of the plates.

The samples were the removed from the seawater. The thickness of the biofoulant was measured in 10 places on each plate, and an average thickness calculated.

The plates were then treated to remove the mature biofoulant for a treatment period of 1 minute using the apparatus of FIG. 1. A single chamber was used for the testing, powered by a single transducer. The transducer was driven in continuous wave mode at 70 kHz, with a power amplifier supplying 100 W to the single transducer. The area of the target surface that was covered by the cleaning chamber at any given time was 36 cm$^2$, whilst the area of the sample plates was 100 cm$^2$ (the plates measured 10 cm by 10 cm). That means that, to cover the entire plate, the device was continuously moved over the plate containing established mature biofoulant placed for 1 minute, during which time any particular section might statistically be covered for 25% of the time.

The rms acoustic pressure amplitude that could be generated across the treated surface was measured prior to testing, using a plate of the material through which a hydrophone just protruded into the water, such that its active element was aligned with the surface to be cleaned (usually the upper surface of a plate laid flat). The rms acoustic pressure over steel was 16.8 kPa, over aluminium was 17.3 kPa, but over rubber was much less, at 11.2 kPa. These values show that the cleaning process here was by non-inertial cavitation (since inertial cavitation would have required in excess of 100 kPa). The rubber significantly reduced the rms pressure that could be generated across it, as expected because it is more absorbent than the metals (both in terms of not reflecting the sound back into the water to the same extent that the metals do, and absorbing a portion of the sound that enters it by converting it to heat). Nevertheless, good cleaning was still possible because the rigid walls of the chamber assisted in the formation of 11.2 kPa rms acoustic pressure even on the surface of the rubber.

Although the samples were out of the water for cleaning by the device, the device could have cleaned them when submerged. Removal from the water was to ensure electrical safety in this prototype, as the safety protocol for this experimental prototype included keeping the power amplifier and high voltage away from the water.

The thickness of the remaining biofoulant after the treatment was measured in 10 places on each plate, and an average thickness calculated. The difference between the initial and final thickness measurements was calculated and expressed as a percentage value for the biofoulant that was removed from the plate surfaces.

The same treatment was then completed using a rotating brush device, as described below for Comparative Example 1.

The results are shown in Table 1.

TABLE 1

|  | Example 1 (the ultrasonic device) Thickness Reduction % (+/−standard deviation) | Comparative Example 1 (rotating brush device) Thickness Reduction % (+/−standard deviation) |
|---|---|---|
| Steel | 91 (+/−4) | 40 (+/−12) |
| Aluminium | 94 (+/−3) | 97 (+/−1) |
| Rubber | 80 (+/−1) | 64 (+/−1) |

It may be seen from Table 1 that for each of the three materials tested, steel, aluminium and rubber, the treatment time of only 1 minute achieved a high removal percentage of the mature macroscopic biofouling.

Comparative Example 1

Some of the plates used in Example 1 were subjected to a conventional cleaning treatment using rotary brushing for a period of 1 minute rather than using acoustic energy in accordance with the present invention. The % thickness reduction was again calculated and the results are shown in Table 1.

Table 1 shows that for the steel and rubber plates the use of acoustic energy provided significantly improved cleaning as compared to brushing. For aluminium, the thickness reduction were similar for Example 1 and Comparative Example 1, however the aluminium surface was significantly damaged by scratching by the bristles of the brush. The brush was also mechanically damaged and required replacement. The rubber plate was also damaged by scratching by the bristles of the brush.

Summary for Example 1: This data shows that the method and apparatus of the present invention are highly effective at removal of mature macroscopic biofouling. The removal by the ultrasonic device was significantly greater than removal by the rotating brush for the same treatment time, except for aluminium, where statically there was no difference in their cleaning performance.

After use, the brush was so badly damaged that it could no longer be used. Furthermore, the samples that were brushed showed scratches and damage to all three surfaces, particularly the rubber. No damage could be detected, either through visual or microscopic examination, of the samples that were cleaned using the ultrasonic device, and no damage was sustained to the ultrasonic device during these tests.

Example 2 and Comparative Example 2

In this Example, biofouling was prevented using an apparatus and method according to the invention.

Samples of steel, aluminium and rubber plates (3 samples of each material) of surface area 10 cm×10 cm were submerged in a seawater dock for a period of 21 days. During this period, mature biofoulant was established on the surfaces of the plates.

For each material, one set of samples was used as a control in Comparative Example 2 and during the 21 day test period the plate was not removed from the seawater and mature biofoulant was established on the surface of the plate.

A second set of samples was removed from the seawater once per week and upon each removal the plate was then treated for a treatment period of 1 minute using the apparatus of FIG. 1 in Example 2. The transducers were driven in continuous wave mode at 70 kHz, with a power amplifier supplying 100 W to each transducer. The area of the target surface that was covered by the cleaning chamber at any given time was 36 cm$^2$, whilst the area of the sample plates was 100 cm$^2$ (the plates measured 10 cm by 10 cm). That means that, to cover the entire plate, the device was placed stationary for 15 s over each of the four quadrants of a plate. The cleaning time was set to 1 minute for each plate (15 s for each quadrant), which would allow for the entire sample area to be under the cleaning chamber for sufficient time for the surface cleaning action to take place.

The rms acoustic pressure amplitude that could be generated across each treated surface was as described in Example 1.

Although the samples were out of the water for cleaning by the device, the device could have cleaned them when submerged. Removal from the water was to ensure electrical safety in this prototype, as the safety protocol for this experimental prototype included keeping the power amplifier and high voltage away from the water.

The treated plate was then returned to the seawater to continue the submersion within the 21 day test period.

A third set of samples was removed from the seawater twice per week and upon each removal the plate was then similarly treated for a treatment period of 1 minute using the apparatus of FIG. 1 in Example 2. The exposures were identical to those given for the second set of samples.

The treated plate was then returned to the seawater to continue the submersion within the 21 day test period.

Thus in Comparative Example 2 each plate within the first set of samples was not treated in the 21 day test period, in Example 2 each plate within the second set of samples was treated a total of three times in the 21 day test period and each plate within the third set of samples sample was treated a total of 6 times in the 21 day test period.

Again, thickness measurements of any biofouling on the plate surfaces were measured and calculated as described for Example 1.

Figure 3:
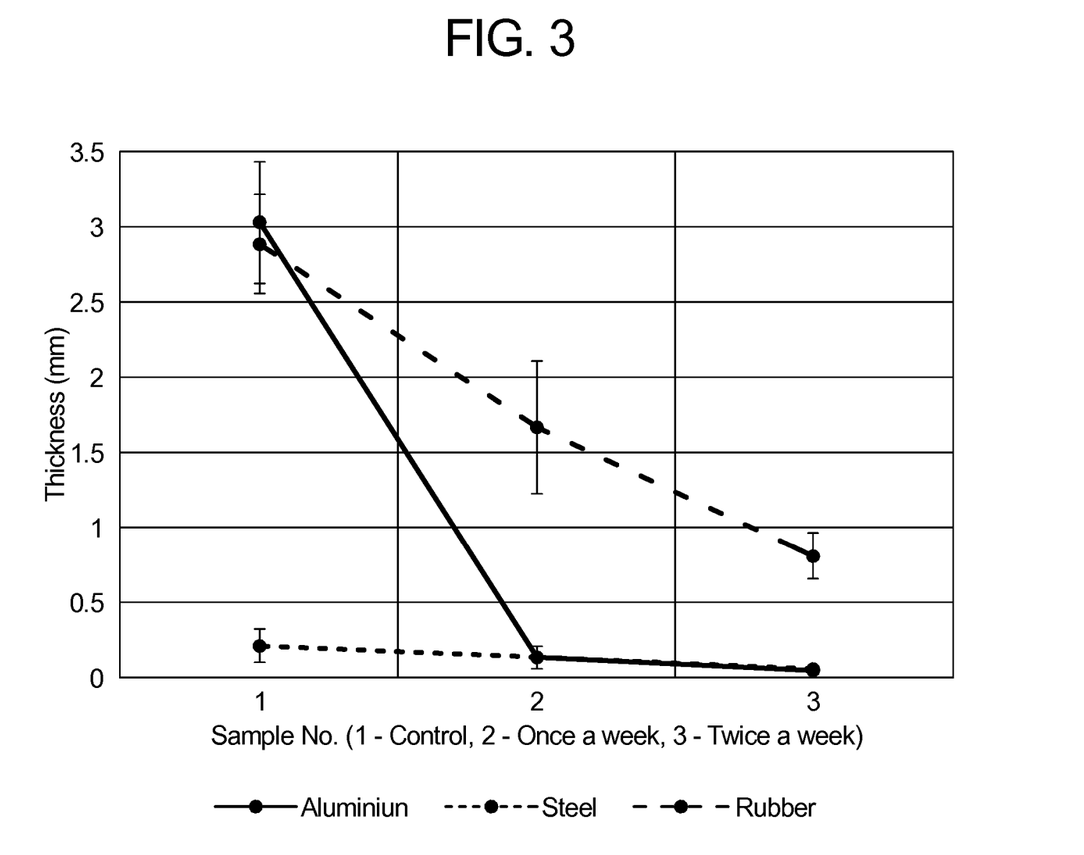
FIG. 3 is a graph showing the relationship between bifoulant thickness and treatment of various materials (comparing treatment of an area of hull once a week (2), twice a week (3) versus control) in accordance with an Example of the invention and a Comparative Example.

The results are shown in FIG. 3. FIG. 3 shows that for the second and third sets of samples of each material, according to Example 2, the repeated and regular acoustic energy treatment protocol prevented any biofouling from becoming established. For the weekly and twice weekly acoustic energy treatments, no significant biofilm, which was readily visible to the naked eye, was formed.

Therefore in Example 2 the plates were treated even when a skilled person would not have readily recognised that any treatment against biofouling was required. Such a treatment protocol unexpectedly provided a reliable and repeatable method for prevention of marine biofilm formation, and prevention of marine biofouling, on surfaces subjected to an underwater environment.

Various other modifications of the invention will be readily apparent to those skilled in the art, and are included within the scope of the invention as defined by the appended claims.

The invention claimed is:

1. An apparatus comprising:
a body defining a cavity, the body terminating in a distal open end that is adapted, in use, to be in the vicinity of a surface to be treated such that the surface forms a first end wall of a chamber within the cavity;
an acoustic transducer mounted to the body proximate n opposite second end wall of the chamber, the acoustic transducer being adapted to introduce acoustic energy into the chamber which is directed from the second end wall towards the first end wall thereby to allow acoustic pressure fluctuations to be generated at the surface to be treated, the acoustic pressure fluctuations being sufficient to cause cleaning of the surface to be treated;
a reservoir for a liquid including an inlet passage for liquid flow into the reservoir and an outlet passage for liquid flow from the reservoir into the chamber; and
a liquid conditioning unit adapted to remove bubbles from the liquid supplied to the chamber, wherein the liquid conditioning unit has an input for liquid and an output for liquid, the output being connected to the inlet passage of the reservoir, wherein the liquid conditioning unit comprises a casing having a plurality of compartments serially located between the input and output, at least one of the compartments including a headspace at an upper part thereof for collecting gas released from liquid flowing through the liquid conditioning unit,
wherein the liquid conditioning unit is fitted to the body by a gimbal mechanism to permit the liquid conditioning unit to pivot relative the body so that when the liquid conditioning unit is submerged in water, the headspace is maintained in an upwardly oriented position by buoyancy of the headspace in the water.

2. An apparatus according to claim 1, wherein the plurality of compartments define a serpentine path therebetween.

3. An apparatus according to claim 1, wherein the input is located at a center of the plurality of compartments and the output is located at a periphery of the plurality of compartments.

4. An apparatus according to claim 1, wherein a volume of the compartments of the plurality of compartments increases in a flow direction from the input to the output so that a flow rate decreases in the flow direction.

5. An apparatus according to claim 1, wherein the liquid conditioning unit is fitted to the body so that the headspace is oriented in a direction away from the distal open end.

6. An apparatus according to claim 1, wherein the liquid conditioning unit is rigidly fitted above the body, the input is at an upper end of the liquid conditioning unit and the output is at a lower end of the liquid conditioning unit and communicates directly with the inlet passage of the reservoir.

7. An apparatus according to claim 1, wherein each compartment comprises a filter element.

8. An apparatus according to claim 7 wherein each filter element substantially fills the respective compartment.

9. An apparatus according to claim 7, wherein the filter element comprises a porous open cell foam or sponge.

10. An apparatus according to claim 1, wherein the compartments are annular and are mutually separated by annular walls.

11. An apparatus according to claim 1, further comprising a vent for the headspace to permit gas flow away from the upper part of the casing.

12. An apparatus according to claim 1, wherein the liquid conditioning unit comprises a vortex chamber.

13. An apparatus according to claim 1, wherein the liquid conditioning unit is adapted to remove, from the liquid, bubbles having a diameter of greater than 100 µm.

14. An apparatus according to claim 1, further comprising a liquid degasser upstream of the input of the liquid conditioning unit which is adapted to remove dissolved gas from the liquid.

15. A surface treating assembly for prevention and treatment of marine biofouling, the assembly including multiple apparatuses according to claim 1, wherein the multiple apparatuses are assembled together in a mutually adjacent or tessellated form to form a linear or two-dimensional array of the bodies of the multiple apparatuses to form a linear or two-dimensional array of a plurality of mutually adjacent or tessellated chambers, each chamber being associated with a respective acoustic transducer.

16. A surface treating assembly according to claim 15 further comprising a phase controller for providing that the acoustic transducers of the multiple apparatuses emit acoustic energy in phase with each other.

17. A surface treating assembly according to claim 15, wherein each chamber is acoustically isolated from any adjacent chamber.

18. An apparatus according to claim 1, wherein the apparatus is configured to be operated while submerged below a liquid surface of a subversive liquid, and wherein the acoustic transducer is configured for controlling an amplitude of the acoustic energy to vary with a depth of the acoustic transducer below the liquid surface.

19. An apparatus, comprising:
- a body defining a cavity, the body terminating in a distal open end that is adapted, in use, to be in the vicinity of a surface to be treated such that the surface forms a first end wall of a chamber within the cavity;
- an acoustic transducer mounted to the body proximate an opposite second end wall of the chamber, the acoustic transducer being adapted to introduce acoustic energy into the chamber which is directed from the second end wall towards the first end wall thereby to allow acoustic pressure fluctuations to be generated at the surface to be treated, the acoustic pressure fluctuations being sufficient to cause cleaning of the surface to be treated,
- a reservoir for a liquid including an inlet passage for liquid flow into the reservoir and an outlet passage for liquid flow from the reservoir into the chamber; and
- a liquid conditioning unit adapted to remove bubbles from the liquid supplied to the chamber, wherein the liquid conditioning unit has an input for liquid and an output for liquid, the output being connected to the inlet passage of the reservoir, wherein the liquid conditioning unit comprises a casing having a plurality of compartments serially located between the input and output, at least one of the compartments including a headspace at an upper part thereof for collecting gas released from liquid flowing through the liquid conditioning unit,
- wherein the liquid conditioning unit comprises a vortex chamber, and wherein the vortex chamber is fitted to the body by a gimbal mechanism to permit the vortex chamber to pivot relative the body so that when the vortex chamber is submerged in water, a headspace in the vortex chamber is maintained in an upwardly oriented position by buoyancy of the headspace in the water.

* * * * *